Jan. 31, 1961 J. K. MOSHER 2,969,803
CENTER OF GRAVITY FUEL CONTROL SYSTEM
Filed March 22, 1956 8 Sheets-Sheet 1

INVENTOR,
JAMES K. MOSHER.

BY

ATTORNEY

Fig. 3

INVENTOR,
JAMES K. MOSHER.

ATTORNEY

Jan. 31, 1961    J. K. MOSHER    2,969,803
CENTER OF GRAVITY FUEL CONTROL SYSTEM
Filed March 22, 1956    8 Sheets-Sheet 5

Fig. 5.

INVENTOR,
JAMES K. MOSHER.
BY
ATTORNEY

Jan. 31, 1961  J. K. MOSHER  2,969,803
CENTER OF GRAVITY FUEL CONTROL SYSTEM
Filed March 22, 1956  8 Sheets-Sheet 8

Fig. 8.

INVENTOR,
JAMES K. MOSHER.
BY
ATTORNEY

United States Patent Office 2,969,803
Patented Jan. 31, 1961

2,969,803

CENTER OF GRAVITY FUEL CONTROL SYSTEM

James K. Mosher, Pasadena, Calif., assignor to Schulz Tool and Manufacturing Co., a corporation of California Filed Mar. 22, 1956, Ser. No. 573,254

17 Claims. (Cl. 137—98)

This invention relates to control systems for the delivery of fuel and transfer of fuel between tanks in an aircraft fuel system having multiple tanks, the purpose being to maintain a distribution of fuel in the tanks about the center of gravity of the aircraft, so that the center of gravity does not shift beyond certain limits.

The invention may find application by way of example, in a delta wing type of aircraft where there may be a large fuselage tank and four wing tanks spaced transversely and longitudinally. The center of gravity of the aircraft is near the geometric center formed by the pattern of the tanks, and the center of gravity must not shift more than certain limited amounts either transversely or longitudinally, or the stability of the aircraft and its ability to be controlled will be destroyed. The invention provides a control system whereby fuel levels in transversely spaced tanks are controlled relative to each other so as to maintain the stability of the aircraft transversely and controls are provided as between the level in the fuselage tank and one or more longitudinally spaced wing tanks, to maintain the longitudinal stability. In other words, a distribution of fuel in the tanks is maintained about the center of gravity of the aircraft to prevent its shifting more than a predetermined amount.

In a preferred form of my invention transverse control of the center of gravity is maintained by balancing the levels of fuel in two transversely spaced wing tanks relative to each other. This is preferably by way of float controls in the tanks and a three-way valve controlling the feeding of fuel from the tanks to the engine. A primary object of the invention is, accordingly, to provide for maintaining distribution of fuel in this manner.

The invention in a preferred form provides control whereby the level in the fuselage tank, for example, is maintained relative to or balanced against the level in one or more longitudinally spaced wing tanks to maintain the longitudinal stability, that is, to control the longitudinal position of the center of gravity. The fuselage tank preferably feeds into the two forward wing tanks, the after-wing tanks feeding into the forward wing tanks which in turn feed direct to the engine. Longitudinal control is preferably by way of float valves which maintain a balance as between feeding of fuel from the fuselage tank to the forward wing tanks and from the after-wing tanks to the forward wing tanks. It is an object of the invention to provide longitudinal control of the stability of an aircraft in this manner by regulating the distribution of fuel in the tanks.

The invention preferably utilizes float controlled pilot valves or servos which control air actuated servos or actuator mechanisms, these servos in turn controlling hydraulic actuators which are balanced against each other in the transverse and longitudinal center of gravity control and which in turn control servo mechanisms which regulate valves controlling the distribution of fuel. In a preferred form of the invention the float actuated pilot valves are mechanically actuated by the air servos to provide positive positioning thereof, whereby an extremely positive acting system is provided whereby accurate distribution of fuel transversely and longitudinally may be had for controlling the position of the center of gravity.

The invention features a modified form of system which is slightly less positive but lighter in weight. In the modified form of the invention the transverse control is between the after-wing tanks until they become empty, these tanks feeding into the forward wing tanks, the transverse control then shifting to the forward wing tanks.

In this modified form of system the pilot valves are actuated only by floats and are not otherwise mechanically positioned, thus providing a system having reduced weight.

In a further modified form of the invention a further reduction in weight is achieved by utilizing a different type of float actuated pilot valve which acts to control an air servo directly without intermediate valves.

Further objects and numerous of the advantages of the invention will become apparent from the following detailed description and annexed drawings, wherein.

Figure 1:
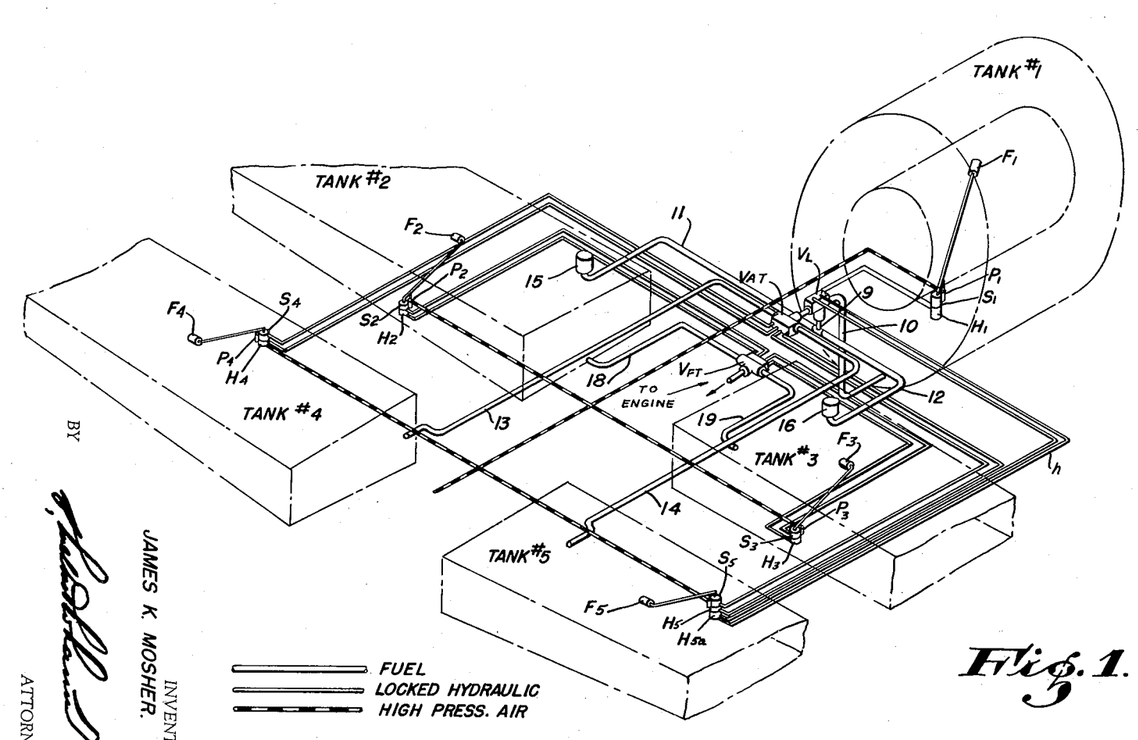
Fig. 1 is a schematic perspective view of a fuel distribution system for a typical type of aircraft.
Figure 2:
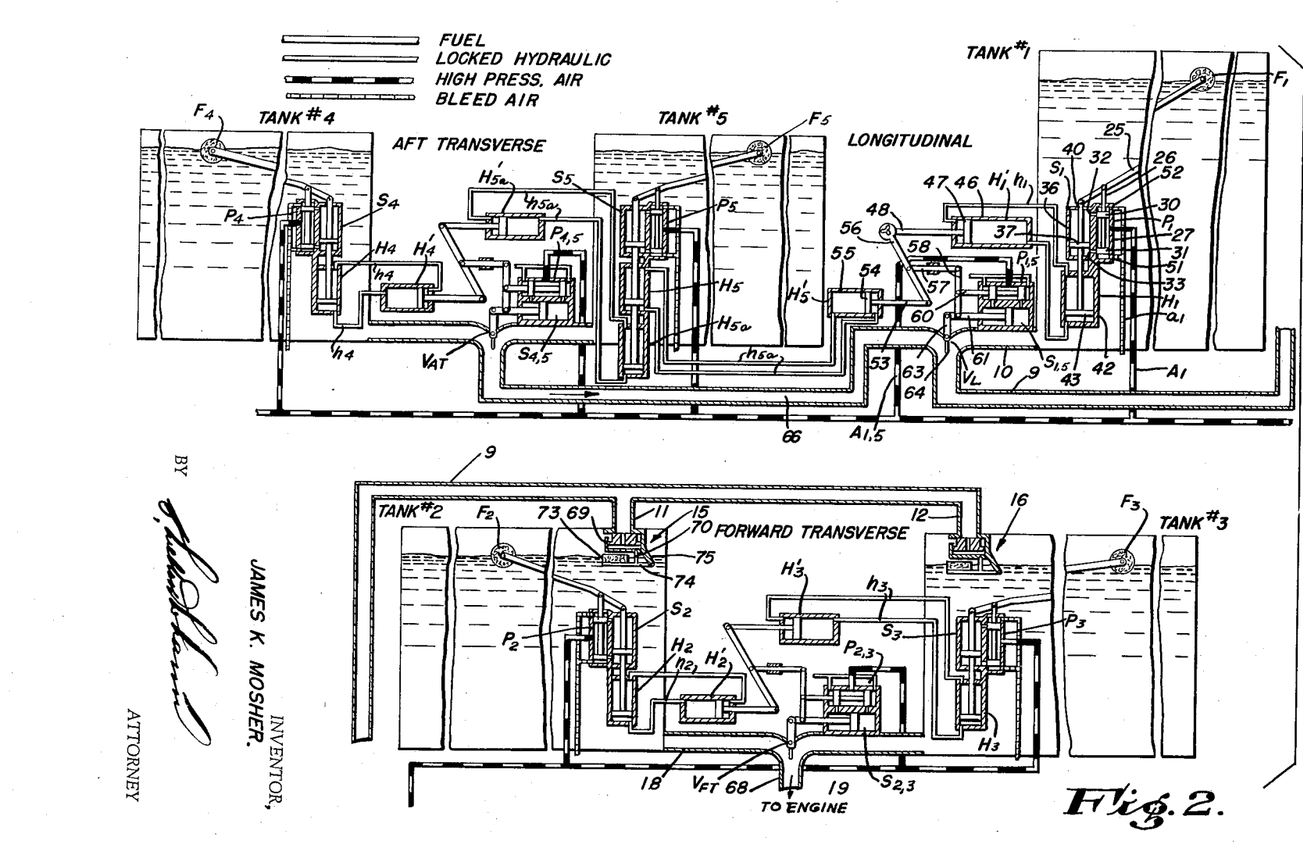
Fig. 2 is a diagrammatic view of the complete control system of Fig. 1.

Referring now to Figs. 1 and 2 of the drawings, in this system there are tanks Nos. 1, 2, 3, 4 and 5 arranged about the center of gravity of the aircraft as shown; the aircraft may typically be a delta wing type. Tank No. 1 is a fuselage tank on the longitudinal center line of the aircraft, and the other tanks are wing tanks. Tank No. 1 feeds into tanks Nos. 2 and 3 through a fuel line 10, three-way valve $V_L$ and fuel lines 11 and 12.

The three-way valve $V_L$ is the longitudinal center of gravity control valve as will be described.

Tanks 4 and 5 feed into tanks 2 and 3 by way of lines 13 and 14, three-way valve $V_{AT}$ and three-way valve $V_L$. Float valves 15 and 16 may be provided at the ends of lines 11 and 12 to close them off when tanks 2 and 3 are full.

Tanks 2 and 3 feed to the engine by way of fuel lines 18 and 19 and three-way valve $V_{FT}$.

The present system provides for forward transverse control of the center of gravity by means of valve $V_{FT}$ and after transverse control of the center of gravity by way of valve $V_{AT}$.

In each of the tanks is a float designated by the characters $F_1$ to $F_5$. The floats actuate pilot valves designated by the characters P in each of the tanks, and the pilot valves in turn control air servos designated by the characters S. The air servos designated by the characters S in turn actuate hydraulic servos designated by the characters H which are connected to hydraulic actuators associated with the various three-way valves as will be described presently. The fuel, hydraulic, and high pressure airlines are indicated by the legend on Fig. 1, and the hydraulic lines are further indicated by the character $h$. On Fig. 1 the high pressure airlines lead to the various pilot valves and air servos.

Referring now to Fig. 2 of the drawings, this figure shows the control system of Fig. 1 with the various control components shown in detail. The various fuel tanks are shown diagrammatically in positions to facilitate the illustration of the automatic control system. The various aspects of the control system will be described separately beginning with the longitudinal control of the center of gravity relative to the axis of the aircraft.

Longitudinal—Fig. 1 system

The control of the center of gravity longitudinally is by maintaining a balance relatively between the weights of fuel in tanks 1 and 5 as illustrated in Fig. 2. The float controls in tanks 1 and 5 control the three-way valve $V_L$ so as to maintain a balance between the levels in these tanks so that the distribution of fuel by weight remains steady longitudinally relative to the center of gravity; that is, as these tanks empty, the rate of outflow from each is controlled so that the relative weights of fuel fore and aft of the center of gravity remain the same.

The float $F_1$ in tank 1 is attached to an arm 25 which is pivoted to the stem 26 of pilot valve $P_1$. The pilot valve $P_1$ includes a cylinder 27, and on the stem 26 are two pistons or valve members 30 and 31 which cooperate with ports 32 and 33 communicating with air servo cylinder $S_1$. Branch high pressure airline $A_1$ connects to cylinder 27 intermediate the members 30 and 31. The air servo $S_1$ includes a cylinder 36 having therein a piston 37 on a stem 40 connected to the end of the float arm 25. The ports 32 and 33 are on opposite sides of the piston 37. The stem 40 extends into the cylinder 42 of hydraulic actuator $H_1$ and carries piston 43. The cylinder 42 communicates with the cylinder 46 of hydraulic actuator $H_1'$. In this cylinder is a piston 47 attached to a rod or stem 48. The hydraulic lines are designated by the character $h_1$. In the operation of the mechanism as so far described as the level in tank 1 falls, the float $F_1$ moves downwardly, moving the stem 26 downwardly so as to open port 33 to branch $A_1$ and to close port 32 to branch $A_1$. At the same time outlet port 51 is closed and outlet port 52 is opened to port 32, the outlet ports connecting with bleed airline $a_1$. This admits high pressure to the space underneath piston 37 which moves up an increment and the stem 40 moves up in a manner to move the stem 26 upwardly, that is, to reposition the members 30 and 31 to the position shown in Fig. 2 so that the servo $S_1$ is again in a balanced position with the ports 32 and 33 closed. The actuators $H_1$ and $H_1'$ are hydraulic, being filled with an hydraulic fluid, and when piston 43 moves up, some of this fluid is forced into cylinder 46 to the left of piston 47, which moves to the right an increment. From the foregoing it can be seen that the mechanism operates in positive increments.

The stem 48 is pivoted to the end of a lever arm 56, and the lower end of this arm is pivoted to the stem 53, connected to a piston 54 in the cylinder 55 of hydraulic actuator $H_5'$. The arm 56 at an intermediate point is connected to a guided push rod or stem 57 which in turn is pivoted to the end of a lever arm 58. The arm 58 is connected at an intermediate point to the stem 60 of pilot valve $P_{1,5}$. The pilot valve $P_{1,5}$ is in all respects similar to pilot valve $P_1$. It is associated with air servo $S_{1,5}$ which is in all respects similar to air servo $S_1$, and the operation is similar. The lower end of arm 58 is connected to the stem 61 of air servo $S_{1,5}$. The stem 61 connects to the end of the operating arm 63 of the valve member 64 of three-way valve $V_L$. As previously described, this valve controls the relative outflows as between tank No. 1 and tanks 4 and 5 to fuel conduit 9 which delivers fuel through conduits 11 and 12 to tanks 2 and 3.

Referring now to tank 5, the controls in this tank include a float $F_5$, a pilot valve $P_5$, an air servo $S_5$, and an hydraulic actuator $H_5$, which are similar to and operate the same as the corresponding components of tank 1. The controls of tank 5 include an additional hydraulic actuator $H_{5a}$ which will be referred to again presently. The cylinder of actuator $H_5$ is connected to the cylinder 55 of actuator $H_5'$, similarly to the hydraulic system of tank 1. The operation of the float mechanism of tank 5 is the same as that of tank 1 and, as will be observed, when there is an upward movement of the piston of actuator $H_5$ there will be a movement to the right of the piston 54 of actuator $H_5'$. This moves the arm 56 in a counterclockwise direction fulcruming about its upper end and moving stem 57 to the right. It can be seen therefore that the hydraulic pistons 47 and 54 are balanced against each other and when one moves, the fulcrum point is at the opposite end of the arm 56.

The control operation as between tanks 1 and 5 will now be described in the light of the foregoing description. When there is a drop in level in tank No. 1, the control mechanism associated therewith operates as has already been described. When piston 47 moves to the right, it results in movement of the valve members of pilot $P_{1,5}$ to the right. As a result, high pressure air is admitted to the right of the piston in air servo $S_{1,5}$ in the same operative manner as described in connection with servo $S_1$. The piston in air servo $S_{1,5}$ now moves to the left, moving arm 63 in a counterclockwise direction and moving arm 64 to restrict the flow out of tank 1.

The operation resulting from a drop in level in tank No. 5 is in all respects similar, with the result that the piston in air servo $S_{1,5}$ moves to the right so that the valve member 64 tends to restrict flow out of conduit 66 from tanks 4 and 5. It can be seen therefore that the float controls in tanks 1 and 5 are balanced against each other so that the levels in these tanks are controlled relatively to each other by controlling the outflow therefrom. Since tank 1 is of a different size than tank 5, the controls are arranged so that the relative balanced outflows are such as to maintain uniform relative weights of fuel as between these tanks. As will be described presently, there are controls which maintain equal levels in tanks 4 and 5 so that the longitudinal center of gravity control can be provided by the balanced control as between tanks 1 and 5.

Forward transverse—Fig. 1 system

There is provided a forward transverse control of the center of gravity by maintaining equal fuel levels in the forward transverse tanks 2 and 3. These tanks feed out through conduits 18 and 19 respectively, to three-way valve $V_{FT}$, which delivers fuel to conduit 68 which leads to the engine.

The inlet float valve 15 in tank No. 2 includes a housing 69 having an inlet port controlled by a valve member 70 which is automatically adjustable by a float 73 on a pivoted arm 74 which is pivoted to a bracket 75. When the level in tank No. 2 reaches a predetermined height the inlet float valve closes. The float valve 16 in tank No. 3 is in all respects similar and operates the same. The float controls in tanks 2 and 3 are in all respects similar to those previously described in connection with tanks Nos. 1 and 5, and the parts are designated by similar reference characters. It is not necessary therefore to repeat the description of these components in detail. It is sufficient to point out that the outflow from tanks Nos. 2 and 3 is balanced against each other in the same manner by way of the three-way valve $V_{FT}$ so that as the levels in these tanks go down, it remains the same in both. Thus, there is an even lateral or transverse distribution of weight of fuel as respects the center of gravity of the aircraft. The control of valves $V_L$ and $V_{FT}$ is a modulating control as will be understood from the foregoing.

Aft transverse—Fig. 1 system

There is also provided an aft transverse control of the center of gravity by providing controls for maintaining a uniform distribution of fuel weight as between tanks Nos. 4 and 5. As previously pointed out, the controls of tank No. 5 include an additional hydraulic actuator $H_{5a}$ which is associated with an hydraulic actuator $H_{5a}'$. The controls as between tanks Nos. 4 and 5 are otherwise in all respects the same as between the other control pairs of tanks; that is, the float controls of these tanks are balanced against each other by way of the hydraulic actuators to adjust the three-way valve $V_{AT}$ to control the relative outflows from these tanks to the conduit 66 so as to maintain equal levels therein. As previously pointed out, these tanks feed into the forward transverse tanks Nos. 2 and 3.

From the foregoing, those skilled in the art will observe that the control system acts automatically to maintain a steady distribution of weight of fuel longitudinally as respects the center of gravity, and it also acts to maintain a steady distribution of weight of fuel transversely as between the forward transverse tanks and the after transverse tanks. The center of gravity of the aircraft is therefore maintained in a steady position and it does not deviate as a result of lack of uniform distribution of weight of fuel in a way to disturb the stability and controllability of the aircraft.

Figure 3:
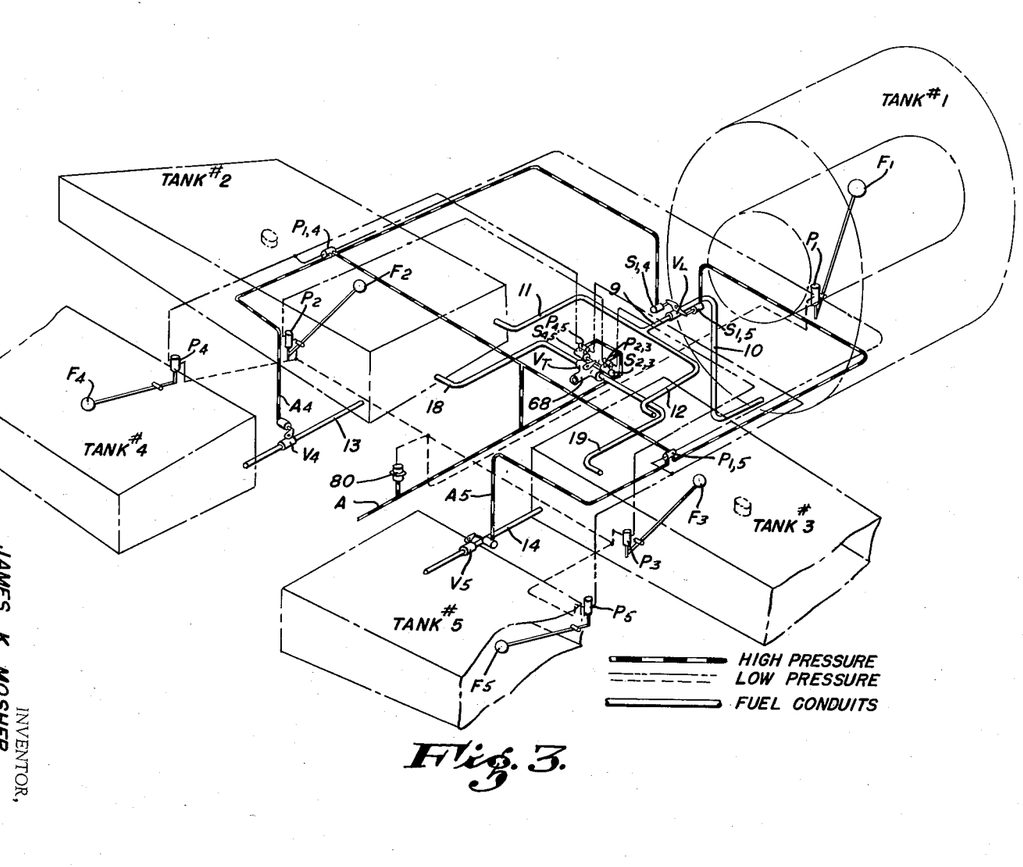
Fig. 3 is a schematic perspective view of a fuel system similar to that of Fig. 1, having a slightly different control arrangement and feed sequence.

Referring to Fig. 3 of the drawings, there is shown diagrammatically a slightly modified system which is considerably lighter in weight than the previous system but is slightly less positive in action. In Fig. 3 the arrangement of tanks is the same. In Fig. 3 tank No. 1 feeds into tanks Nos. 2 and 3 through the valve $V_L$. The transverse tanks 4 and 5 feed directly into the tanks 2 and 3 through the valves $V_4$ and $V_5$ respectively. Tanks 2 and 3 feed into the engine through the three-way valve $V_T$. The valve $V_T$ is the transverse center of gravity control and it is controlled by either or both of a pair of air servos $S_{4,5}$ and $S_{2,3}$. In the system of Fig. 3 the transverse control is initially as between tanks Nos. 4 and 5, and when these tanks are empty the transverse control automatically shifts to tanks 2 and 3. When the shift takes place the control of the valve $V_T$ shifts from one of its air servos to the other. The control of valve $V_T$ may also be in response to both the servos $S_{2,3}$ and $S_{4,5}$ when tanks 2 and 3 are at an intermediate level and tanks 4 and 5 are at an intermediate level. In the system of Fig. 3 the longitudinal control is between tanks Nos. 4 and 1 and also between tanks Nos. 5 and 1. In other words, a balance is maintained both between tanks Nos. 1 and 4 and between tanks Nos. 1 and 5. The longitudinal control valve $V_L$ is adjustable by either of two air servos $S_{1,4}$ or $S_{1,5}$ as will be explained more in detail shortly.

Each of the float valves operates a pilot valve designated by the character P as in the previous embodiment.

To accommodate the longitudinal control as between tanks 1 and 4 and tanks 1 and 5 there are provided pilot relay valves $P_{1,4}$ and $P_{1,5}$ as will be referred to more in detail presently.

In Fig. 3 the fuel conduits, the high pressure airline and low pressure airlines are indicated as shown by the legend. Numeral 80 designates a pressure regulator which provides a supply of regulated low pressure air to the low pressure lines which are controlled by the various pilot valves. The high pressure airline has branches as shown, leading to the various air operated valves and air servos, the branches to the valves $V_4$ and $V_5$ and $V_L$ being through the pilot relays $P_{1,4}$ and $P_{1,5}$. The low pressure air lines are indicated diagrammatically on Fig. 3 and will be referred to more in detail presently. The transverse and longitudinal center of gravity control systems of Fig. 3 will be described next.

Transverse—Fig. 3 system

Figure 4:
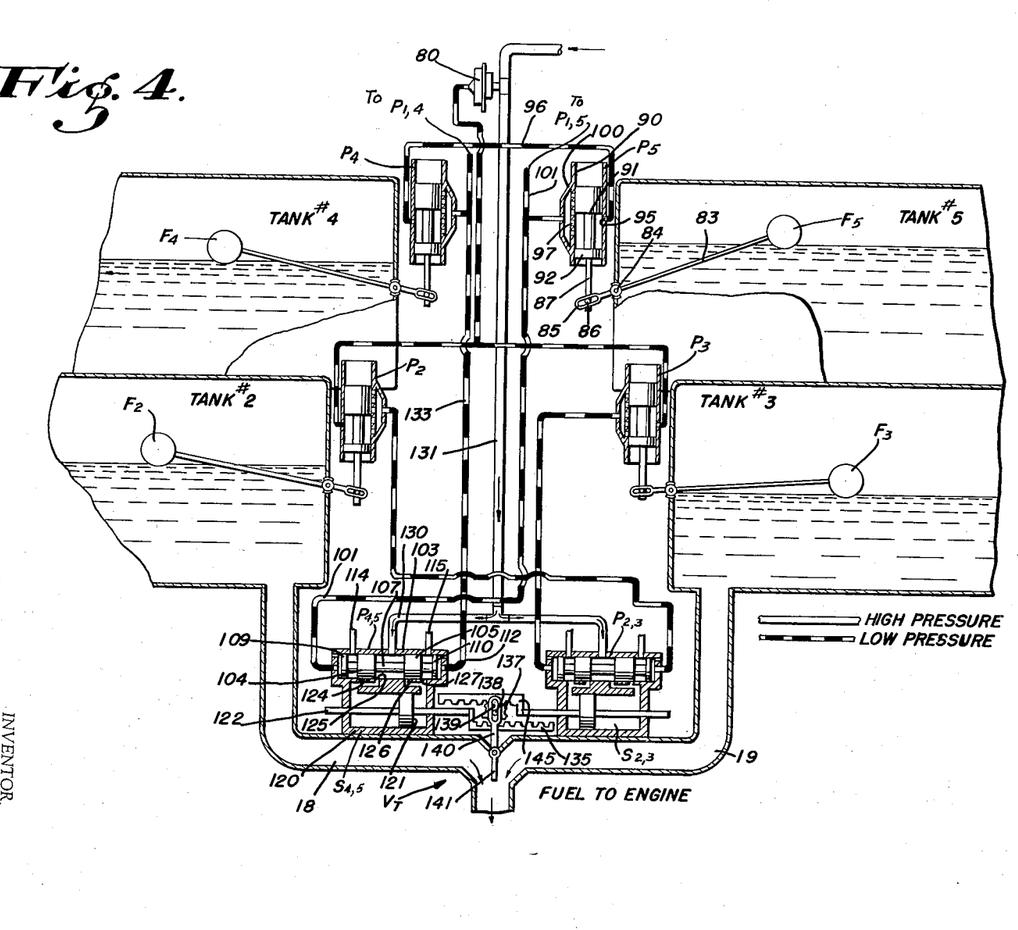
Fig. 4 is a diagrammatic view of the transverse center of gravity control arrangement of the system of Fig. 3.

The transverse control system of Fig. 3 is shown more in detail in Fig. 4. In this figure tanks Nos. 4, 5, 2 and 3 are shown, it being borne in mind that tanks 4 and 5 feed into tanks 2 and 3 respectively. The control is initially from tanks 4 and 5 by way of the air servo $S_{4,5}$. When these tanks become empty the transverse control shifts to the servo $S_{2,3}$ which is controlled from tanks 2 and 3. Ordinarily tanks 2 and 3 are the main tanks and they remain full until the forward and aft tanks are empty. Referring to the float controls in tank No. 5 by way of example, the float $F_5$ is on a pivoted float arm 83 which is pivoted at 84 as shown, and has a slotted end portion 85, the slot engaging a pin 86 on the end of the stem 87 of pilot valve $P_5$. The pilot valve $P_5$ includes a cylinder 90 having two pistons therein, 91 and 92, on the stem 87. Numeral 95 designates an inlet port in the side of the cylinder 90 connecting with the regulated pressure line 96. In the opposite side wall of the cylinder 90 are a group of outlet ports 97 adjacent which the piston 91 moves. These ports communicate with an outlet chamber 100 which connects with the controlled pressure airline 101. In the operation of the float actuated valve $P_5$ when there is a fall in level in tank 5, the float moves downwardly and the pistons 91 and 92 move upwardly. This increases the pressure which is allowed to pass through the ports 97 into the line 101, and this is transmitted to the relay pilot valve $P_{4,5}$. The relay valve $P_{4,5}$ is a double valve comprising a cylinder or sleeve 103. Within the sleeve 103 are piston or valve members 104 and 105 cooperating with inlet and outlet ports communicating with the cylinder of air servo $S_{4,5}$. The valve members 104 and 105 are on stem 107, and on the end of the stem are pistons or discs 109 and 110. The controlled pressure airline 101 communicates with the chamber at the end of piston 109, and communicating with the chamber at the end of the piston 110 is a similar controlled pressure airline 112 controlled by the pilot valve $P_4$. Numerals 114 and 115 designate bleed lines from the spaces between the two pistons at each end of the stem 107.

The air servo $S_{4,5}$ comprises a cylinder 120 having a piston 121 therein on a stem 122. There are two ports communicating with the chamber on each side of the piston 121, designated respectively at 124, 125, 126 and 127. These ports are controlled by the pistons 104 and 105. When stem 107 moves to the left, piston 104 uncovers port 125, admitting high pressure air from branch 130 of high pressure airline 131 to the left side of piston 121, causing it to move to the right. At this time piston 105 uncovers port 127, bleeding the chamber on the right side of piston 121 to atmosphere through the line 115.

The pilot valve $P_4$ operates in the same manner as pilot valve $P_5$. It can be seen therefore, when there is a drop in level in tank 4, an increased pressure is supplied to the end of the piston 110 through the line 133, and the stem 107 moves to the left into the position shown. This admits high pressure air into the air servo $S_{4,5}$ in the manner described, tending to cause stem 122 to move to the right. When there is a fall in level in tank 5, the operation of relay pilot $P_{4,5}$ is the opposite, and the operation of servo $S_{4,5}$ is the opposite. As will be described, a fall in level in tank 4 tends to restrict the flow out of tank 2 through the conduit 13, and a fall in level in tank 5 tends to restrict the flow out of tank 3 through conduit 19.

As previously pointed out, the valve $V_T$ which controls the feed of fuel to the engine, is controlled by either of the servos $S_{4,5}$ or $S_{2,3}$. Mechanism is provided whereby the valve $V_T$ is actuated by either or both of these servos. This mechanism includes a rack 135 on the end of the stem 122, and it cooperates with a floating pinion 137. The pinion 137 has an axle 138 engaged in a slot 139 in the end of the operating lever 140 of the valve member 141 of the valve $V_T$. When the stem 122 moves to the right in the manner described, the pinion 137 is moved to the right without movement of the opposite rack. Its axle 138 moves the lever 140 in a clockwise direction, and the member 141 moves to restrict flow out of the conduit 18. On a fall in level in tank 5 the operation is the opposite. Thus it can be seen that the controls of tanks 4 and 5 are balanced against each other through the pilot relay $P_{4,5}$ so that the valve $V_T$ is modulatingly controlled to maintain the same level in these tanks.

When the tanks 4 and 5 become empty as described, the control shifts to the servo $S_{2,3}$ which is responsive to tanks 2 and 3. The pilot controls associated with these tanks are the same as those previously described, as is the relay pilot and the air servo. No further detailed description of these components is therefore necessary. The valve $V_T$ will now be controlled in a manner to maintain equal levels in the tanks 2 and 3. That is, the valve member 141 will now be controlled by the rack 145 in the same manner as it was previously controlled by the rack 135. The operation is otherwise the same, and thus need not be described in further detail. Depending on engine requirements for fuel the level in all of tanks 2, 3, 4 and 5 may be at an intermediate point and the differential rack and pinion mechanism will then control valve $V_T$ in response to both the couple between tanks 2 and 3 and between tanks 4 and 5 which will apply a combined correction to the valve.

From the foregoing it can be observed that the controls as described in connection with Fig. 4, will maintain transverse stability in the system as shown in Fig. 3. The longitudinal control system of Fig. 3 will next be described.

*Longitudinal—Fig. 3 system*

Figure 5:
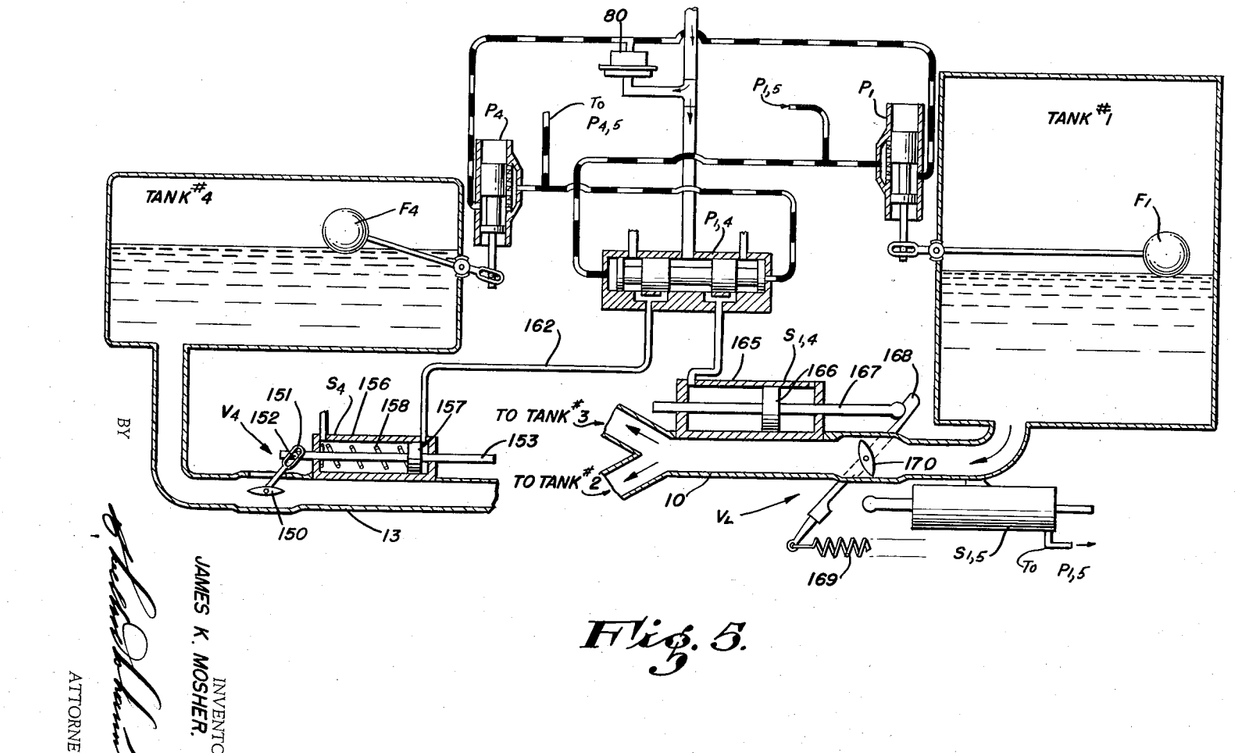
Fig. 5 is a diagrammatic view of the longitudinal center of gravity control system for the system of Fig. 3.

Referring now to Fig. 5 of the drawings, this figure shows in more detail the components of the longitudinal center of gravity control system of Fig. 3, that is, as between tanks 1 and 4, the system as between tanks 1 and 5 being the same, and corresponding to the detailed showing in Fig. 5.

In Fig. 5 the float controls are the same as described in connection with Fig. 4. The pilot relay $P_{1,4}$ is the same as the pilot relays of the previous embodiment. This pilot relay is responsive to tanks 1 and 4. The pilot relay $P_{1,4}$ controls valve $V_4$ which is in the outlet conduit 13 of tank 4, and it also controls servo $S_{1,4}$ which controls valve $V_L$ in the outlet 10 of tank 1.

The valve $V_4$ includes a valve member 150, movable by a lever 151 having a slot in its end engaging a pin 152 on the end of the stem 153 of servo mechanism $S_4$. The servo $S_4$ comprises a cylinder 156 having a piston 157 therein, which is biased by a spring 158. The chamber at the right of the piston 157 is connected by line 162 with one of the valves of pilot relay $P_{1,4}$. It can be seen therefore that when there is a drop in level in tank 4, an increased pressure is applied to the right end of pilot relay $P_{1,4}$ resulting in high pressure being applied to the piston 157, moving it to the left and tending to close the valve $P_4$.

The servo $S_{1,4}$ includes a cylinder 165 having a piston 166 therein, on a stem 167, which engages one end of an operating lever 168 attached to the valve member 170 of valve $V_L$. Lever 168 is biased in a counter-clockwise direction by coil spring 169. In operation, a drop in level in tank 1 will apply an increased pressure to the pilot relay $P_{1,4}$ which will adjust it to admit high pressure to the left of piston 166, moving stem 167 to the right. This tends to close the valve $V_L$, thus restricting the flow out of tank 1 through the conduit 10. Thus it can be seen that the controls in tanks 1 and 4 are balanced against each other in a manner to control the outflow from these tanks in order to maintain a uniform distribution of weight of fuel as between these tanks. In other words, the level in these tanks will go down at such respective rates that they would empty at the same time.

The longitudinal control system also maintains a balanced relationship as between tanks 1 and 5. In Fig. 5 the character $S_{1,5}$ designates an additional air servo which may operate the valve $V_L$ in response to the relationship of levels between tanks 1 and 5. This servo is the same as the servo $S_{1,4}$. It will be observed that there is an outlet connection from the pilot valve $P_1$ to the pilot relay $P_{1,5}$ (see Fig. 3), and this pilot relay in turn has a connection to the servo $S_{1,5}$ as shown in Fig. 5. The operation of the valve $V_5$ from pilot relay $P_{1,5}$ is the same as the operation of the valve $V_4$. In the longitudinal control as between tanks 1 and 4, and between 1 and 5 flow will be restricted from that tank which is at the lowest level whether it be 1, 4, or 5.

From the foregoing it can be observed that the present embodiment provides a system of transverse and longitudinal control as respects the center of gravity whereby a uniform distribution of weight of fuel is maintained about the center of gravity. The system is somewhat lighter than that of the previous embodiment although being slightly less positive in action. As in the previous system however, control of the stability and controllability of the aircraft is maintained.

Figure 6:
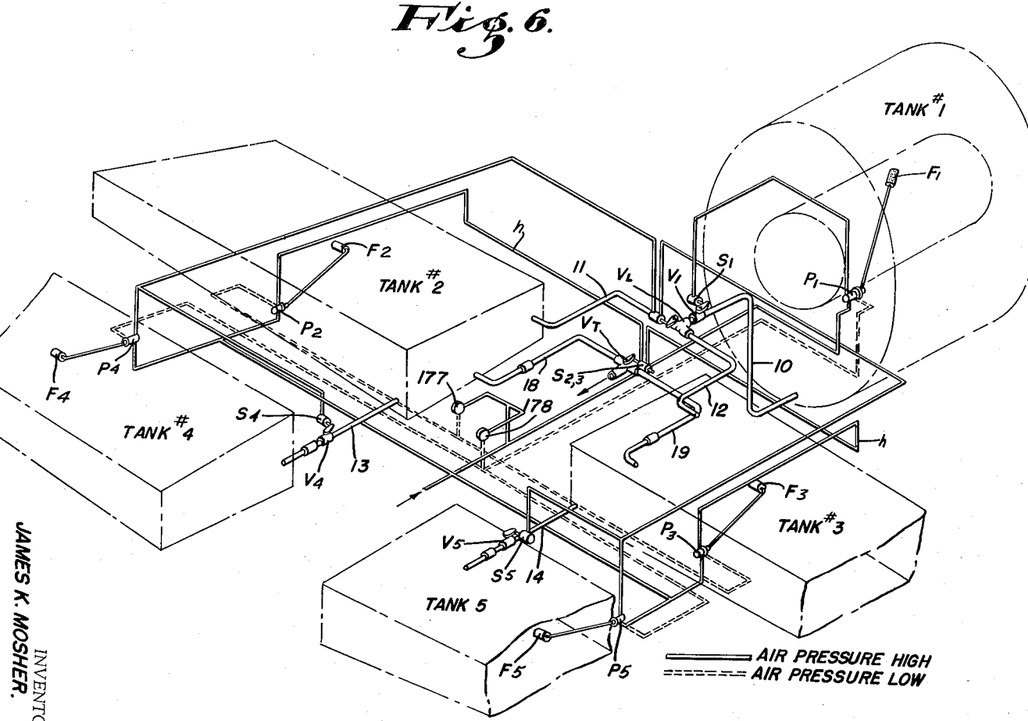
Fig. 6 is a schematic perspective view of a similar fuel system having another slightly modified control arrangement and feed sequence.

Referring to the system of Fig. 6, this system represents a slightly modified form of the invention wherein the system is still lighter in weight but is slightly less positive in action than the previous embodiment. In this system tank 1 feeds into tanks 2 and 3 through a valve $V_1$ and a three-way valve $V_L$. Tanks 4 and 5 feed into tanks 2 and 3 respectively through valves $V_4$ and $V_5$. Tanks 2 and 3 feed to the engine through the three-way valve $V_T$. The transverse control in this system is between tanks 2 and 3 by way of the valve $V_T$. The longitudinal center of gravity control is between tanks 1 and 4, and between 1 and 5, as in the previous embodiment. The present embodiment utilizes air servos for operating the valves as in the previous embodiment. However, in the present embodiment the float actuated pilot valves are of a slightly different type such that no pilot relays are utilized between the pilot valves and the servos. The system is thus considerably lighter but less positive in action. The air servos are indicated by the character S as in the previous embodiments. In Fig. 6 the high pressure airlines are shown in full lines to the various pilot valves and air servos, and the low pressure lines are shown as broken lines. In Fig. 6, numerals 177 and 178 designate pressure regulators which provide a regulated pressure from the high pressure line to the low pressure lines. The various airlines will be referred to in greater detail in connection with Figs. 7 and 8.

*Transverse—Fig. 6 system*

Figure 7:
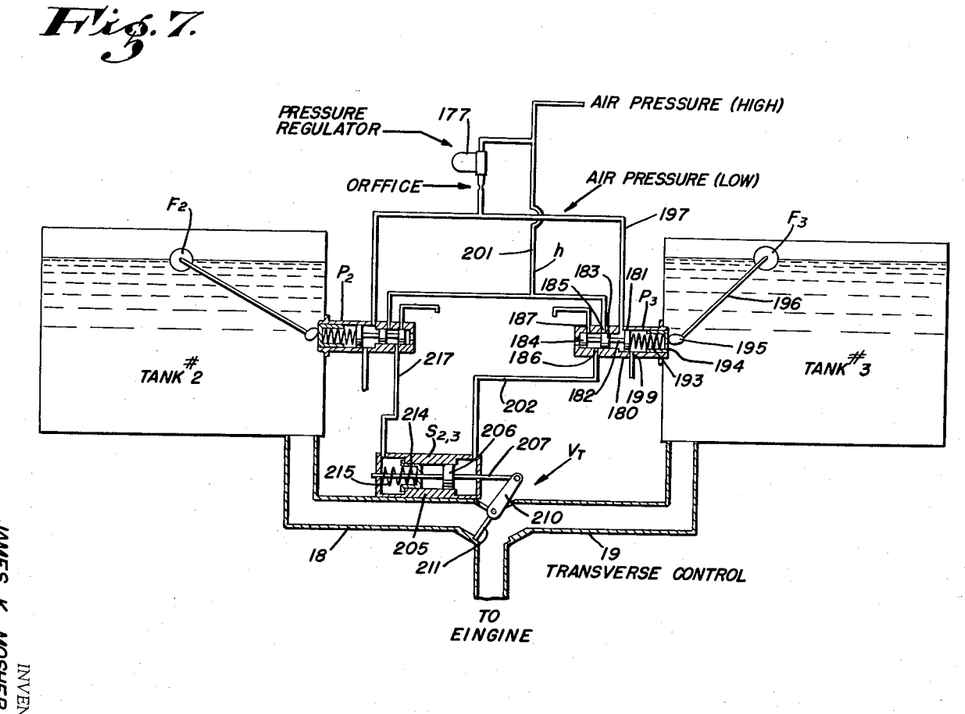
Fig. 7 is a diagrammatic view of the transverse center of gravity control arrangement for the system of Fig. 6.

Referring now more particularly to Fig. 7, the pilot valve $P_3$ in this figure comprises a cylinder 180 having therein a piston 181 on a stem 182 having thereon valve members 183 and 184 which cooperate with inlet port 185, outlet port 186, and bleed port 187. The piston 181 is normally biased to the left by a coil spring 193 which engages a slidable sleeve or head 194, the end of which bears against a cam 195 attached to the end of the float arm 196 which carries the float $F_3$. The low pressure airline 197 connects to the space to the left of the piston 181 which is larger than the valve member 183, and the piston 181 also cooperates with a bleed port 199. When the level in tank 3 falls, the float $F_3$ moves downwardly, moving the cam 195 in a manner to reduce the pressure exerted against the sleeve 194. The pressure acting against the left face of piston 181 moves it to the left such that the valve member 183 uncovers port 185 and valve member 184 closes bleed port 187. This admits high pressure air from line 201 to line 202 to actuate the air servo $S_{2,3}$ as will be described. As the piston 181 moves to the right it will uncover bleed port 199 releasing the pressure on the left side of the piston, and the pilot valve $P_3$ will then be returned to the position shown in Fig. 7 by the biasing spring 193.

The air servo $S_{2,3}$ comprises a cylinder 205 having a bore therein, with a piston 206 fitting in the bore. Piston 206 is on a stem 207 connected to the operating lever 210 of the valve member 211 of valve $V_T$. Carried on the stem 207 in the bore within cylinder 205 is a fitting 214 in the form of a piston, which is biased to the right by a coil spring 215, and this piston is controlled by pilot valve $P_2$ as will be described.

When pressure is admitted to the right of piston 206 through line 202 as a result of a fall in pressure in tank 3 as described, piston 206 moves to the left, moving lever 210 counterclockwise and moving valve member 211 to stop the flow from tank No. 3.

The pilot valve $P_2$ of tank 2 is in all respects similar to the pilot valve $P_3$. In a similar manner it controls the supply of high pressure air through a line 217 to the left of piston 214. In the same manner, upon a fall in level of tank No. 2, piston 206 will be moved to the right to shut off the flow in tank No. 2. Pilot valves $P_2$ and $P_3$ operate in a balanced manner relative to each other. For example, when the bias on spring 193 is reduced by a fall in level in tank 3, movement of piston 181 causes a pressure drop in line 197. Valve $P_2$ now moves to the right since its spring is not balanced and pressure in line 217 is released. In this way the control shifts back and forth between $P_2$ and $P_3$.

From the foregoing it can be seen that the servo $S_{2,3}$ is controlled by the float controls in tanks 2 and 3 so that these controls are balanced against each other in a manner such that as the fuel is withdrawn therefrom, equal levels are maintained in the tanks. The controls utilized are relatively simple and light in weight but provide for appropriate transverse control of the center of gravity as described.

*Longitudinal—Fig. 6 system*

Figure 8:
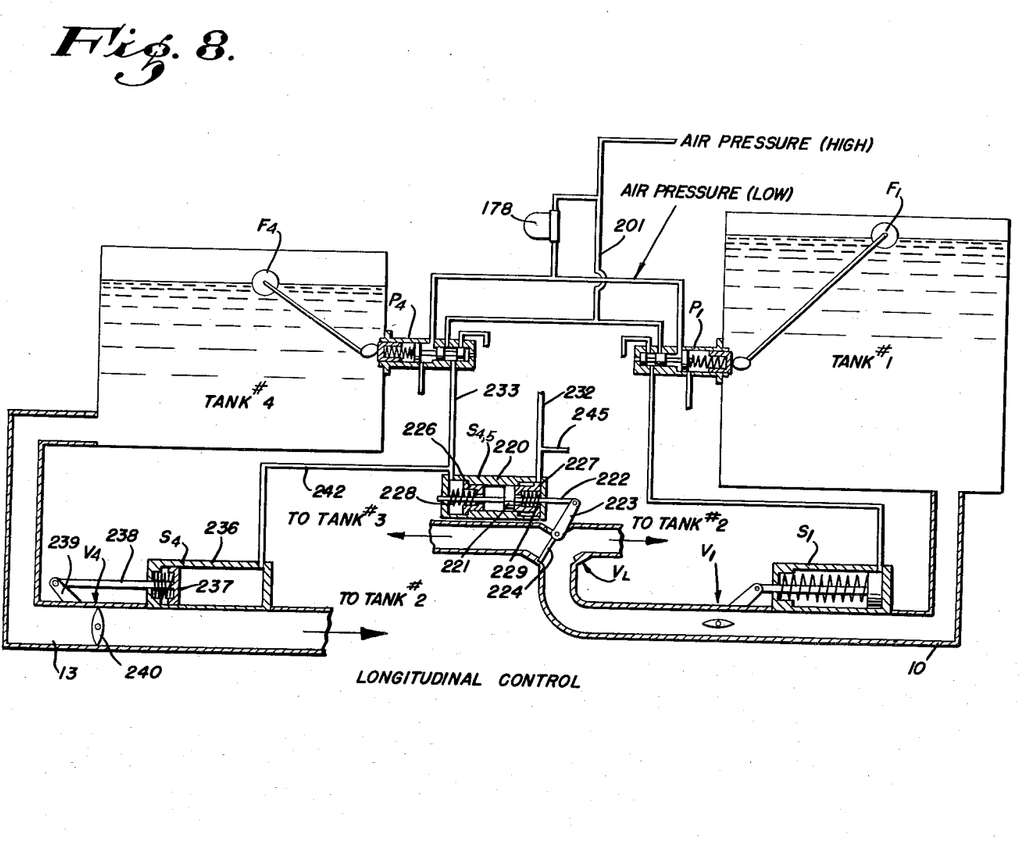
Fig. 8 is a diagrammatic view of the longitudinal center of gravity control system for the system of Fig. 6.

Referring now to Fig. 8 of the drawings, the pilot valves are of the same detailed construction as those of the previous embodiment. The air servo $S_{4,5}$ in Fig. 8 comprises a cylinder 220 having a piston 221 fitting in a bore therein. Piston 221 is on a stem 222 attached to the operating lever 223 of the valve member 224 of the longitudinal three-way control valve $V_L$. The bore of the cylinder 220 has fitted therein a pair of sleeves or fittings 226 and 227 which are respectively biased inwardly by coil springs 228 and 229. The air servo $S_{4,5}$ is controlled by the pilot valves $P_4$ and $P_5$, the airline connection to pilot valve $P_5$ being indicated at 232 and the line to the pilot valve $P_4$ being indicated at 233. Upon a fall in level in tank 4 high pressure air is admitted to the left end of cylinder 220, and the piston 221 moves to the right, moving lever 223 counterclockwise and moving valve member 224 to shut off flow to tank 3 as described. When piston 221 moves to the right the sleeve 227 is carried with it, compressing the biasing spring 229. Tank No. 1 now feeds into tank No. 2 only. In response to a control impulse from tank 5 piston 221 similarly moves to the left, moving valve $V_L$ so that tank 1 does not feed into tank 2 but only into tank 3. The control as so far described is actually a transverse control as between tanks 4 and 5, the controls of Fig. 8 otherwise providing longitudinal control, as will be described.

Pilot valve $P_4$ also controls the servo $S_4$ which comprises a cylinder 236, having therein a cylinder 237 on a stem 238 connecting to the operating lever 239 of a valve member 240. The valve $V_4$ having valve member 240 controls the feed out of tank No. 4. When the level falls in tank 4 and high pressure air is supplied through line 233 and line 242, piston 247 moves to the left, closing valve $V_4$ as shown. From the foregoing it can be seen that upon a drop in level from tank 4, outflow from this tank is stopped and the valve $V_1$ is set so that tank No. 1 feeds only into tank No. 2. Upon a drop in level in tank 5 the operation is the reverse, flow from tank 5 being stopped and tank 1 then feeding only into tank No. 3. The shut-off valve $V_5$ for tank 5 is not shown on Fig. 8 but it is closed when high pressure air is supplied through line 245 branching from line 232.

Pilot valve $P_1$ of tank 1 controls the valve $V_1$ in the same manner that pilot valve $P_4$ controls the valve $V_4$.

Pilot valve $P_1$ is balanced against $P_4$ so that longitudinal control is provided as between both tanks 1 and 4 and 1 and 5. When the level in tank 1 is low, valve $V_L$ assumes a mid position with equal feed from tanks 4 and 5 and none from tank 1.

In the foregoing manner the control arrangement as described operates to maintain transverse control of the center of gravity and longitudinal control of the center of gravity.

From the foregoing, those skilled in the art will observe that I have provided a control system for the distribution of fuel among the various tanks of an aircraft such as to maintain the center of gravity transversely and longitudinally in a steady position. In this manner the stability and controllability of the aircraft is not lost. The various embodiments operate in response to liquid levels in various tanks such that uniform distributions of fuel weight are maintained. The various embodiments vary in the degree of positiveness of the control provided, those that are less positive being lighter in weight. All of the systems however are efficient and effective for their purpose.

The foregoing disclosure is representative of preferred embodiments of my invention and it is intended that they be interpreted in an illustrative rather than a limiting sense, it being understood that various modifications and alternatives may be adopted by those skilled in the art, all falling within the realm and scope of the claims appended hereto.

I claim:

1. In a mechanism for maintaining equal liquid levels in a plurality of tanks in combination, means comprising a three-way valve controlling flow from two of the tanks, means comprising a liquid level responsive mechanism in each of the tanks and means whereby the three-way valve is conjointly controlled by the liquid level responsive means in the separate tanks, each of the liquid level responsive means comprising a servo cylinder and a pilot valve therefor, the pilot valve being in the form of a slide valve having a stem and means comprising a float mechanically connected to the pilot valve and its associated servo cylinder whereby when an increment of movement is imparted to the servo cylinder as the result of movement of the pilot valve, the servo cylinder imparts a follow-up increment of movement to the pilot valve.

2. In a system of controlling the position of the center of gravity in an aircraft having fuel tanks disposed transversely relative to a longitudinal axis through the center of gravity and fuel tanks disposed longitudinally relative to a transverse axis through the center of gravity, in combination, means comprising fuel connections between a pair of transverse tanks, means comprising fuel connections between a pair of longitudinally disposed tanks; and means comprising control valves in the fuel connections and liquid level responsive means in the various tanks whereby equal liquid levels are maintained in the transversely disposed tanks and equal liquid levels are maintained in the longitudinally disposed tanks.

3. In a control mechanism in combination, a first servo cylinder, a second servo cylinder, a rack connected to the first cylinder, a rack connected to the second cylinder, a pinion floatingly disposed between and engaging said racks and a pivoted lever operable by said pinion, the lever having a slot therein engaging the axle of the pinion.

4. The structure of claim 3, including a valve operable by said lever whereby the valve may be actuated by either of said servo cylinders.

5. In a system of fuel control for an aircraft, in combination: means comprising two pairs of tanks arranged transversely relative to a longitudinal axis through the center of gravity of the aircraft; means comprising a three-way valve controlling flow of fuel from a pair of transverse tanks to the aircraft power plant; and means comprising a three-way valve controlling flow of fuel from one pair of transverse tanks to another pair of transverse tanks.

6. The structure of claim 5, including means comprising a tank spaced longitudinally relative to a longitudinal axis through the center of gravity of the aircraft and means whereby said longitudinally spaced tank feeds into a pair of transverse tanks.

7. In a fuel control system for an aircraft, in combination: means comprising fuel tanks arranged transversely relative to a longitudinal axis through the center of gravity of the aircraft; means comprising fuel tanks spaced longitudinally relative to a transverse axis through the center of gravity of the aircraft; means comprising a three-way valve whereby transversely arranged tanks feed fuel to the aircraft power plant; and means whereby said longitudinally spaced tanks feed fuel directly into said transversely arranged tanks.

8. The structure of claim 7 wherein said longitudinally speed tanks include a fuselage tank; and means whereby said fuselage tank feeds fuel into both of two transversely arranged tanks.

9. In a system of control of the center of gravity of an aircraft or the like, having fuel tanks disposed transversely relative to a longitudinal axis through the center of gravity and fuel tanks disposed longitudinally relative to a transverse axis through the center of gravity, said tanks including two pairs of transverse tanks and a fuselage tank; means for controlling the levels in the various tanks to stabilize the position of the center of gravity comprising in combination; means for providing forward transverse control of the center of gravity comprising valve means controlling the flow from the forward transverse tanks; level responsive means in the forward transverse tanks controlling said valve means whereby to maintain uniform levels in the said forward transverse tanks; valve means controlling the flow from the after transverse tanks; and level responsive means in the after transverse tanks controlling said last valve means whereby to maintain uniform levels in the after transverse tanks.

10. The structure of claim 9, including valve means controlling the flow from the fuselage tank; level responsive means in the fuselage tank; and means interconnecting said last level responsive means and the level responsive means in one of the transverse tanks and associated with said last mentioned valve means whereby to maintain a controlled relationship between the level in the fuselage tank and one of the transverse tanks.

11. In a system of control of the center of gravity of an aircraft, in combination: means comprising a pair of fuel tanks disposed transversely relative to a longitudinal axis through the center of gravity; means comprising a second pair of similarly disposed tanks; means comprising a three-way valve controlling the flow of fuel from one of said pair of tanks to the aircraft power plant; level responsive means in all of said tanks; control mechanism for said valve means comprising a device responsive to the levels in one pair of tanks whereby to maintain uniform levels in said pair of tanks; and a second device responsive to the levels in the other pair of tanks whereby the control mechanism is operative in response to signals from the two pairs of tanks whereby to maintain uniform levels in a single pair of tanks or to maintain uniform levels in both pairs of tanks.

12. The structure of claim 11 wherein the control mechanism comprises a first servo cylinder responsive to the levels in one pair of tanks, a second servo cylinder responsive to the levels in the other pair of tanks; a rack operative by each of the servo cylinders; a floating pinion engaged between the two racks; and means interconnecting the axle of the pinion and the valve means whereby the valve means may be adjusted in response to either of the servos or may be differentially adjusted in response to both of the servos.

13. In a system of control of the center of gravity of an aircraft whereby the center of gravity may be stabilized both transversely and longitudinally, in combination: means comprising fuel tanks disposed transversely relative to a longitudinal axis through the center of gravity of the aircraft; means comprising a fuselage tank spaced longitudinally relative to a transverse axis through the center of gravity of the aircraft; control means providing for feeding of fuel from transverse tanks to the aircraft power plant; control means providing for feeding of fuel from the fuselage tank to the transverse tanks; level responsive means in all of the tanks; means interconnecting the level responsive means in transverse tanks and the control means controlling flow of fuel to the power plant whereby to maintain transverse stability of the center of gravity; and means interconnecting the level responsive means in a transverse tank and the fuselage tank and the control means controlling flow from the fuselage tank whereby to maintain longitudinal control of the center of gravity of the aircraft.

14. In a system of control of the center of gravity of aircraft, in combination: means comprising a pair of fuel tanks disposed transversely relative to a longitudinal axis through the center of gravity of the aircraft; valve means controlling the flow of fuel out of said tanks to the power plant of the aircraft; servo-mechanism controlling said valve means including pilot valves and floats associated therewith responsive to the level in each of said tanks; each of said pilot valves comprising a biasing spring adjustable by its associated float, each of said valves having a piston and a piston chamber connected to a common source of controlled air pressure, the pressures in the piston chambers normally being balanced against each other whereby upon a change in bias of one spring its associated pilot valve operates in a manner to relieve the pressure in the supply from the source whereby the other pilot valve operates in the opposite direction, the pilot valves controlling the said valve means whereby it is shifted between first and second positions in response to alternate increments of decrease of level in the two fuel tanks.

15. In a control system adapted to maintain a balance between control impulses from separate sources, in combination: a pilot valve comprising a cylinder having a piston therein forming a piston chamber, a biasing spring normally balancing the pressure in the piston chamber; a second pilot valve having a similar piston chamber and spring, the piston chambers being connected to a common source of controlled pressure; control means for adjusting the biasing of the springs whereby upon adjustment of one spring its associated pilot valve operates to relieve the pressure acting on the other pilot valve whereby the other valve operates in the opposite direction under the influence of its biasing spring; and means comprising a servo-cylinder having a piston, the pressure on opposite sides of the piston being controlled by the two pilot valves whereby the pilot valves normally maintain a balanced relationship as between the control impulses acting thereon, the valves normally operating alternately in response first to a control impulse on one and then a control impulse on the other.

16. In a system of control of the center of gravity of an aircraft, in combination: means comprising a pair of fuel tanks disposed transversely as respects a longitudinal axis through the center of gravity; means comprising a second pair of fuel tanks disposed transversely as respects a longitudinal axis through the center of gravity; means comprising a fuselage tank spaced longitudinally as respects a transverse axis through the center of gravity; valve means arranged to control the flow out of all tanks; level responsive means in the tanks; means interconnecting the level responsive means in a pair of transverse tanks and the valve means controlling the flow out of said tanks to maintain uniform levels in said pair of tanks; and interconnecting means interconnecting the level responsive means in another pair of transverse tanks and the level responsive means in the fuselage tank responsive to differences in level as between one of the said transverse tanks and the fuselage tank, said interconnecting means controlling the valve means to control the outflows from the tanks whereby to maintain the longitudinal stability of the center of gravity as between the fuselage tank and either one of the said transverse tanks.

17. The structure of claim 16 wherein said interconnecting means includes a three-way valve controlling the outflow from the fuselage tank whereby it may be directed to either one or the other of two forward transverse tanks, the said three-way valve being arranged to be responsive to the level responsive means and interconnecting means so as to direct the outflow from the fuselage tank to a forward transverse tank on the same side of the aircraft as the after transverse tank in which the level is low as indicated by the longitudinal center of gravity control means.

References Cited in the file of this patent

UNITED STATES PATENTS

| | | |
|---|---|---|
| 558,256 | Bush | Apr. 14, 1896 |
| 987,048 | Connet | Mar. 14, 1911 |
| 1,288,966 | Nielsen | Dec. 24, 1918 |
| 1,428,375 | Humphreys | Sept. 5, 1922 |
| 1,921,145 | Albright | Aug. 8, 1933 |
| 1,967,690 | Sherman | July 24, 1934 |
| 2,082,940 | Brisbane et al. | June 8, 1937 |
| 2,418,858 | Urquhart | Apr. 15, 1947 |
| 2,464,852 | De Lisa | Mar. 22, 1949 |
| 2,509,629 | De Giers | May 30, 1950 |
| 2,539,345 | Creel | Jan. 23, 1951 |
| 2,672,880 | Hermanson | Mar. 23, 1954 |
| 2,723,675 | Longford | Nov. 15, 1955 |
| 2,751,921 | Baldwin | June 26, 1956 |
| 2,759,424 | Defibaugh et al. | Aug. 21, 1956 |

FOREIGN PATENTS

| | | |
|---|---|---|
| 731,591 | Great Britain | June 8, 1955 |